(12) United States Patent
Lee et al.

(10) Patent No.: US 7,094,131 B2
(45) Date of Patent: Aug. 22, 2006

(54) MICROELECTRONIC SUBSTRATE HAVING CONDUCTIVE MATERIAL WITH BLUNT CORNERED APERTURES, AND ASSOCIATED METHODS FOR REMOVING CONDUCTIVE MATERIAL

(75) Inventors: Whonchee Lee, Boise, ID (US); Scott G. Meikle, Boise, ID (US); Scott E. Moore, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 271 days.

(21) Appl. No.: 09/887,767

(22) Filed: Jun. 21, 2001

(65) Prior Publication Data

US 2002/0025759 A1 Feb. 28, 2002

Related U.S. Application Data

(63) Continuation-in-part of application No. 09/651,779, filed on Aug. 30, 2000.

(51) Int. Cl.
*B24B 1/00* (2006.01)

(52) U.S. Cl. ............... 451/36; 451/41; 451/63; 451/103; 451/104; 451/106; 438/745; 438/754; 438/756; 205/640; 205/660; 205/674; 216/88; 216/89; 216/90

(58) Field of Classification Search ........... 451/36, 451/41, 63, 103, 104, 106, 113; 438/745, 438/754, 756, 757, 700; 205/640, 660, 674, 205/658, 659, 656, 652; 216/88, 89, 90
See application file for complete search history.

(56) References Cited

U.S. PATENT DOCUMENTS 2,315,695 A   4/1943   Faust
2,516,105 A   7/1950   der Mateosian
3,239,439 A   3/1966   Heimke
3,334,210 A   8/1967   Williams et al.
4,839,005 A   6/1989   Katsumoto et al.

(Continued)

FOREIGN PATENT DOCUMENTS

| EP | 0459397 A2 A3 | 12/1991 |
|---|---|---|
| EP | 1 123 956 A1 | 8/2001 |
| JP | 1-241129 A | 9/1989 |
| JP | 2001077117 A1 | 3/2001 |
| WO | WO 00/26443 | 5/2000 |
| WO | WO 00/28586 | 5/2000 |
| WO | WO 00/32356 | 6/2000 |
| WO | WO 00/59008 | 10/2000 |
| WO | WO 00/59682 | 10/2000 |
| WO | WO 02/064314 A1 | 8/2002 |

OTHER PUBLICATIONS

IBM Technical Disclosure Bulletin, vol. 20, No. b2, 1977, pp. 810–811.*

(Continued)

*Primary Examiner*—Joseph J. Hail, III
*Assistant Examiner*—Alvin J Grant
(74) *Attorney, Agent, or Firm*—Perkins Coie LLP

(57) ABSTRACT

A microelectronic substrate and method for removing conductive material from a microelectronic substrate. In one embodiment, the microelectronic substrate includes a conductive or semiconductive material with a recess having an initially sharp corner at the surface of the conductive material. The corner can be blunted or rounded, for example, by applying a voltage to an electrode in fluid communication with an electrolytic fluid disposed adjacent to the corner. Electrical current flowing through the corner from the electrode can oxidize the conductive material at the corner, and the oxidized material can be removed with a chemical etch process.

49 Claims, 9 Drawing Sheets

U.S. PATENT DOCUMENTS

| | | | |
|---|---|---|---|
| 5,098,533 A | 3/1992 | Duke et al. | |
| 5,162,248 A | 11/1992 | Dennison et al. | |
| 5,244,534 A | 9/1993 | Yu et al. | |
| 5,300,155 A | 4/1994 | Sandhu et al. | |
| 5,344,539 A | 9/1994 | Shinogi et al. | |
| 5,562,529 A | 10/1996 | Kishii et al. | |
| 5,567,300 A * | 10/1996 | Datta et al. | 205/652 |
| 5,575,885 A | 11/1996 | Hirabayashi et al. | |
| 5,618,381 A | 4/1997 | Doan et al. | |
| 5,624,300 A | 4/1997 | Kishii et al. | |
| 5,676,587 A | 10/1997 | Landers et al. | |
| 5,681,423 A | 10/1997 | Sandhu et al. | |
| 5,780,358 A | 7/1998 | Zhou et al. | |
| 5,807,165 A | 9/1998 | Uzoh et al. | |
| 5,840,629 A | 11/1998 | Carpio | |
| 5,843,818 A | 12/1998 | Joo et al. | |
| 5,846,398 A | 12/1998 | Carpio | |
| 5,863,307 A | 1/1999 | Zhou et al. | |
| 5,888,866 A | 3/1999 | Chien | |
| 5,897,375 A | 4/1999 | Watts et al. | |
| 5,911,619 A | 6/1999 | Uzoh et al. | |
| 5,930,699 A | 7/1999 | Bhatia | |
| 5,934,980 A | 8/1999 | Koos et al. | |
| 5,952,687 A | 9/1999 | Kawakubo et al. | |
| 5,954,975 A | 9/1999 | Cadien et al. | |
| 5,954,997 A | 9/1999 | Kaufman et al. | |
| 5,972,792 A | 10/1999 | Hudson | |
| 5,993,637 A | 11/1999 | Hisamatsu et al. | |
| 6,001,730 A | 12/1999 | Farkas et al. | |
| 6,007,695 A | 12/1999 | Knall et al. | |
| 6,010,964 A | 1/2000 | Glass | |
| 6,024,856 A | 2/2000 | Haydu et al. | |
| 6,033,953 A | 3/2000 | Aoki et al. | |
| 6,039,633 A | 3/2000 | Chopra | |
| 6,046,099 A | 4/2000 | Cadien et al. | |
| 6,051,496 A | 4/2000 | Jang | |
| 6,060,386 A | 5/2000 | Givens | |
| 6,060,395 A | 5/2000 | Skrovan et al. | |
| 6,063,306 A | 5/2000 | Kaufman et al. | |
| 6,066,030 A | 5/2000 | Uzoh | |
| 6,066,559 A | 5/2000 | Gonzalez et al. | |
| 6,068,787 A | 5/2000 | Grumbine et al. | |
| 6,083,840 A | 7/2000 | Mravic et al. | |
| 6,100,197 A | 8/2000 | Hasegawa | |
| 6,103,096 A | 8/2000 | Datta et al. | |
| 6,103,628 A | 8/2000 | Talieh | |
| 6,103,636 A | 8/2000 | Zahorik et al. | |
| 6,115,233 A | 9/2000 | Seliskar et al. | |
| 6,117,781 A * | 9/2000 | Lukanc et al. | 216/38 |
| 6,121,152 A | 9/2000 | Adams et al. | |
| 6,132,586 A | 10/2000 | Adams et al. | |
| 6,143,155 A * | 11/2000 | Sammis | 156/230 |
| 6,162,681 A | 12/2000 | Wu | |
| 6,171,467 B1 * | 1/2001 | Weihs et al. | 205/93 |
| 6,174,425 B1 | 1/2001 | Simpson et al. | |
| 6,176,992 B1 | 1/2001 | Talieh | |
| 6,180,947 B1 | 1/2001 | Stickel et al. | |
| 6,187,651 B1 | 2/2001 | Oh | |
| 6,190,494 B1 | 2/2001 | Dow | |
| 6,196,899 B1 | 3/2001 | Chopra et al. | |
| 6,197,182 B1 | 3/2001 | Kaufman et al. | |
| 6,206,756 B1 | 3/2001 | Chopra et al. | |
| 6,250,994 B1 | 3/2001 | Chopra et al. | |
| 6,218,309 B1 * | 4/2001 | Miller et al. | 438/700 |
| 6,259,128 B1 | 7/2001 | Adler et al. | |
| 6,273,786 B1 | 8/2001 | Chopra et al. | |
| 6,276,996 B1 | 8/2001 | Chopra | |
| 6,280,581 B1 | 8/2001 | Cheng | |
| 6,287,974 B1 * | 9/2001 | Miller | 438/706 |
| 6,299,741 B1 | 10/2001 | Sun et al. | |
| 6,303,956 B1 | 10/2001 | Sandhu et al. | |
| 6,313,038 B1 | 11/2001 | Chopra et al. | |
| 6,322,422 B1 | 11/2001 | Satou | |
| 6,328,632 B1 | 12/2001 | Chopra | |
| 6,368,184 B1 | 4/2002 | Beckage | |
| 6,368,190 B1 | 4/2002 | Easter et al. | |
| 6,379,223 B1 | 4/2002 | Sun et al. | |
| 6,395,607 B1 | 5/2002 | Chung | |
| 6,416,647 B1 | 7/2002 | Dordi et al. | |
| 6,455,370 B1 | 9/2002 | Lane | |
| 6,461,911 B1 | 10/2002 | Ahn et al. | |
| 6,464,855 B1 | 10/2002 | Chadda et al. | |
| 6,504,247 B1 | 1/2003 | Chung | |
| 6,620,037 B1 | 9/2003 | Kaufman et al. | |
| 6,689,258 B1 | 2/2004 | Lansford et al. | |
| 6,693,036 B1 | 2/2004 | Nogami et al. | |
| 6,722,942 B1 | 4/2004 | Lansford et al. | |
| 6,736,952 B1 | 5/2004 | Emesh et al. | |
| 6,753,250 B1 | 6/2004 | Hill et al. | |
| 6,776,693 B1 * | 8/2004 | Duboust et al. | |
| 6,780,772 B1 | 8/2004 | Uzoh et al. | |
| 6,848,970 B1 * | 2/2005 | Manens et al. | |
| 6,852,630 B1 * | 2/2005 | Basol et al. | |
| 6,867,136 B1 * | 3/2005 | Basol et al. | |
| 6,881,664 B1 | 4/2005 | Catabay et al. | |
| 6,893,328 B1 * | 5/2005 | So | |
| 2001/0025976 A1 | 10/2001 | Lee | |
| 2001/0036746 A1 | 11/2001 | Sato et al. | |
| 2002/0052126 A1 | 5/2002 | Lee et al. | |
| 2002/0070126 A1 | 6/2002 | Sato et al. | |
| 2002/0104764 A1 | 8/2002 | Banerjee et al. | |
| 2002/0115283 A1 | 8/2002 | Ho et al. | |
| 2003/0054729 A1 * | 3/2003 | Lee et al. | |
| 2003/0064669 A1 | 4/2003 | Basol et al. | |
| 2003/0178320 A1 | 9/2003 | Liu et al. | |
| 2004/0192052 A1 | 9/2004 | Mukherjee et al. | |
| 2004/0259479 A1 * | 12/2004 | Sevilla | |
| 2005/0133379 A1 * | 6/2005 | Basol et al. | |
| 2005/0173260 A1 * | 8/2005 | Basol et al. | |
| 2005/0178743 A1 * | 8/2005 | Manens et al. | |

OTHER PUBLICATIONS

Seilchi Kondo, Noriyuki Sakuma, Yoshio Homma, Yasushi Goto, Naofumi Ohashi, Hizuru Yamaguchi and Nobuo Owada, "Abrasive–Free Polishing for Copper Damascene Interconnection", *Journal of the Electrochemical Society*, 147 (10) 3907–3913 (2000).

U.S. Appl. No. 09/651,779, filed Aug. 30, 2000, Moore.

U.S. Appl. No. 09/651,808, filed Aug. 30, 2000, Chopra et al.

U.S. Appl. No. 09/653,392, filed Aug. 31, 2000, Chopra et al.

U.S. Appl. No. 09/888,002, filed Jun. 21, 2001, Lee et al.

U.S. Appl. No. 09/888,084, filed Jun. 21, 2001, Lee et al.

U.S. Appl. No. 10/090,869, filed Mar. 4, 2002, Moore et al.

U.S. Appl. No. 10/230,463, filed Aug. 29, 2002, Lee et al.

U.S. Appl. No. 10/230,602, filed Aug. 29, 2002, Chopra.

U.S. Appl. No. 10/230,628, filed Aug. 29, 2002, Lee et al.

U.S. Appl. No. 10/230,970 filed Aug. 29, 2002, Lee et al.

U.S. Appl. No. 10/230,972, filed Aug. 29, 2002, Lee et al.

U.S. Appl. No. 10/230,973, filed Aug. 29, 2002, Lee et al.

Frankenthal, R.P. and Eaton, D.H., "Electroetching of Platinum in the Titanium–Platinum–Gold Metallization on Silicon Integrated Circuits," *Journal of The Electrochemical Society*, vol. 123, No. 5, pp. 703–706, May 1976.

Bernhardt, A.F., Contolini, R.J., Mayer, S.T., "Electrochemical Planarization for Multi-Level Metallization of Microcircuitry," *CircuiTree Journal*, vol. 8, No. 10, pp. 38, 40, 42, 44, 46, and 48, Oct. 1995.

Huang, C.S. et al., "A Novel UV Baking Process to Improve DUV Photoresist Hardness," pp. 135–138.

McGraw–Hill, *Concise Encyclopedia of Science & Technology*, Sybil P. Parker, Editor in Chief, Fourth Edition, p. 367, McGraw–Hill, New York, New York, 1998.

ATMI Table of Contents, presented at the Semicon West '99 Low Dielectric Materials Technology Conference, Jul. 12, 1999, pp. 13–25.

Micro Photonics, Inc., CSM Application Bulletin, "Low–load Micro Scratch Tester (MST) for characterisation of thin polymer films," http://www.microphotonics.com/mstABpoly.html, Jul. 25, 2002, 3 pages.

Micro Photonics, Inc., "CSM Nano Hardness Tester", http://www.microphotonics.com/nht.html, Jul. 29, 2002, 6 pages.

PhysicsWorld—Table of Contents, PhysicsWeb, "Hard Materials," http://physicsweb.org/box/world/11/1/11/world-11-1-11-1, Jul. 29, 2002, 1 page.

U.S. Appl. No. 09/653,411, filed Aug. 31, 2000, Lee et al.

PCT Written Opinion dated Jun. 10, 2003 for PCT/US02/19495 filed Jun. 20, 2002 (7 pages).

PCT Written Opinion dated Jun. 10, 2003 for PCT/US02/19496 filed Jun. 20, 2002 (8 pages).

PCT International Search Report dated Jul. 10, 2003 for PCT/US03/06373 filed Feb. 28, 2003 (4 pages).

D'Heurle, F.M. and K.C. Park, IBM Technical Disclosure Bulletin, Electrolytic Process for Metal Pattern Generation, vol. 17, No. 1, pp. 271–272, Jun. 1974, XP–002235691, NN 7406271.

Aboaf, J.A. and R.W. Broadie, IBM Technical Disclosure Bulletin, Rounding of Square–Shape Holes in Silicon Wafers, vol. 19, No. 8, p. 3042, Jan. 1977, XP–002235690, NN 77013042.

Bassous, E., IBM Technical Disclosure Bulletin, Low Temperature Methods for Rounding Silicon Nozzles, vol. 20, No. 2, Jul. 1977, pp. 810–811, XP–002235692, NN 7707810.

PCT International Search Report, International Application No. PCT/US02/19495, Mar. 31, 2003.

PCT International Search Report, International Application No. PCT/US02/19496, Apr. 4, 2003.

PCT International Search Report dated Dec. 1, 2003 for PCT/US03/27181 filed Aug. 27, 2003 (7 pages).

* cited by examiner

MICROELECTRONIC SUBSTRATE HAVING CONDUCTIVE MATERIAL WITH BLUNT CORNERED APERTURES, AND ASSOCIATED METHODS FOR REMOVING CONDUCTIVE MATERIAL

CROSS-REFERENCE TO RELATED APPLICATIONS

This application is a continuation-in-part of U.S. application Ser. No. 09/651,779, titled "Methods and Apparatus for Removing Conductive Material From a Microelectronic Substrate," filed Aug. 30, 2000. Additionally, this application is related to U.S. application Ser. No. 09/888,084 titled "Methods and Apparatus for Electrical, Mechanical and/or Chemical Removal of Conductive Material From a Microelectronic Substrate," filed Jun. 21, 2001, and U.S. application Ser. No. 09/888,002, titled "Methods and Apparatus for Electrically and/or Chemically-Mechanically Removing Conductive Material From a Microelectronic Substrate," filed Jun. 21, 2001. All of the U.S. Patent Applications listed above are incorporated herein by reference.

TECHNICAL FIELD

This invention relates to methods and apparatuses for removing conductive and/or semiconductor material from microelectronic substrates.

BACKGROUND

Microelectronic substrates and substrate assemblies typically include a semiconductor material having features, such as transistors and transistor gates, that are linked with conductive lines. One conventional method for forming transistor gates (shown schematically in FIGS. 1A–C) is shallow trench isolation (STI). Referring first to FIG. 1A, a typical STI process includes doping a semiconductor substrate 10 to form an at least partially conductive material 11. An oxide layer 14 is disposed on the conductive material 11, and a nitride layer 15 is disposed on the oxide layer 14. A mask 16 having mask openings 17 is then positioned over the oxide layer 15, and the semiconductor substrate 10 is etched to form apertures 60, shown in FIG. 1B. As shown in FIG. 1C, the apertures 60 are coated with a gate oxide layer 61, and a gate material 62 is disposed adjacent to the gate oxide 61. Accordingly, the gate oxide 61 can electrically isolate adjacent gates. The nitride layer 14 and the oxide layer 15 can then be removed.

One drawback with the STI structure described above with reference to FIGS. 1A–C is that the conductive material 11 has sharp corners 63 (shown in FIGS. 1B and 1C) at the edges of the apertures 60. The sharp corners 63 can emit electromagnetic radiation (generally in the manner of an antenna) which can interfere with the operation of adjacent semiconductor features. One conventional approach to addressing this drawback is to oxidize material at the sharp corners 63 by exposing the semiconductor substrate 10 to a high temperature environment (e.g., about 1050° C.). The oxidized material is then removed (for example, with an etchant) to blunt the corners. One drawback with this approach is that the curvature that can be achieved with a high temperature process may be limited. Another drawback is that the high temperature can damage portions or components of the semiconductor substrate. Still another drawback is that the high-temperature process can be expensive, which can increase the cost of the products formed from the semiconductor substrate.

One conventional technique for removing bulk conductive material from semiconductor substrates includes applying an alternating current to a conductive layer via an intermediate electrolyte to remove portions of the layer. In one arrangement, shown in FIG. 2A, a conventional apparatus 60 includes a first electrode 20a and a second electrode 20b coupled to a current source 21. The first electrode 20a is attached directly to a metallic layer 11a of a semiconductor substrate 10 and the second electrode 20b is at least partially immersed in a liquid electrolyte 31 disposed on the surface of the metallic layer 11a by moving the second electrode downwardly until it contacts the electrolyte 31. A barrier 22 protects the first electrode 20a from direct contact with the electrolyte 31. The current source 21 applies alternating current to the substrate 10 via the electrodes 20a and 20b and the electrolyte 31 to remove conductive material from the conductive layer 11a. The alternating current signal can have a variety of wave forms, such as those disclosed by Frankenthal et al. in a publication entitled "Electroetching of Platinum in the Titanium-Platinum-Gold Metallization on Silicon Integrated Circuits" (Bell Laboratories), incorporated herein in its entirety by reference.

One drawback with the arrangement shown in FIG. 2A is that it may not be possible to remove material from the conductive layer 11a in the region where the first electrode 20a is attached because the barrier 22 prevents the electrolyte 31 from contacting the substrate 10 in this region. Alternatively, if the first electrode 20a contacts the electrolyte in this region, the electrolytic process can degrade the first electrode 20a. Still a further drawback is that the electrolytic process may not uniformly remove material from the substrate 10. For example, "islands" of residual conductive material having no direct electrical connection to the first electrode 20a may develop in the conductive layer 11a. The residual conductive material can interfere with the formation and/or operation of the conductive lines, and it may be difficult or impossible to remove with the electrolytic process unless the first electrode 20a is repositioned to be coupled to such "islands."

One approach to addressing some of the foregoing drawbacks is to attach a plurality of first electrodes 20a around the periphery of the substrate 10 to increase the uniformity with which the conductive material is removed. However, islands of conductive material may still remain despite the additional first electrodes 20a. Another approach is to form the electrodes 20a and 20b from an inert material, such as carbon, and remove the barrier 22 to increase the area of the conductive layer 11a in contact with the electrolyte 31. However, such inert electrodes may not be as effective as more reactive electrodes at removing the conductive material, and the inert electrodes may still leave residual conductive material on the substrate 10.

FIG. 2B shows still another approach to addressing some of the foregoing drawbacks in which two substrates 10 are partially immersed in a vessel 30 containing the electrolyte 31. The first electrode 20a is attached to one substrate 10 and the second electrode 20b is attached to the other substrate 10. An advantage of this approach is that the electrodes 20a and 20b do not contact the electrolyte. However, islands of conductive material may still remain after the electrolytic process is complete, and it may be difficult to remove conductive material from the points at which the electrodes 20a and 20b are attached to the substrates 10.

SUMMARY

The present invention is directed toward microelectronic substrates that include conductive materials having recesses with rounded corners, and methods for forming such microelectronic substrates. A method in accordance with one aspect of the invention includes disposing an electrolytic fluid adjacent to a conductive material of the microelectronic substrate. The conductive material has a first surface in a first plane and a recess in the first surface, with the recess being bounded by a second surface in a second plane. The conductive material further has a corner between the first and second surfaces. The method can further include removing at least part of the conductive material from the corner by positioning first and second electrodes in fluid communication with the electrolytic fluid, and coupling at least one of the electrodes to a source of electrical potential. Removing the conductive material from the corner can be self-limiting, with the rate at which the conductive material is removed decreasing as the corner is rounded.

In another aspect of the invention, a method for forming a microelectronic substrate can include disposing a generally non-conductive material adjacent to a conductive material of the microelectronic substrate. The method can further include forming a recess extending through the generally non-conductive material and into the conductive material, with the recess defining a corner at least proximate to an interface between the conductive material and the generally non-conductive material. The method can still further include removing at least part of the conductive material from the corner by exposing the corner to an electrical potential to at least partially blunt the corner.

The invention is also directed toward a microelectronic substrate formed by a process that can include disposing a generally non-conductive material adjacent to a conductive material of the microelectronic substrate and forming a recess extending through the generally non-conductive material and into the conductive material. The recess defines a corner at least proximate to an interface between the conductive material and the generally non-conductive material. The process can further include removing at least part of the conductive material from the corner to at least partially blunt the corner.

In another aspect of the invention, the microelectronic substrate can be formed by a process that includes disposing an electrolytic fluid adjacent to a conductive material of a microelectronic substrate, with the conductive material having a first surface in a first plan and a recess in the first surface. The recess can be bounded by a second surface in a second plane, with the conductive material having a corner between the first and second surfaces. The process can further include removing at least part of the conductive material from the corner by positioning first and second electrodes in fluid communication with the electrolytic fluid, and coupling at least one of the electrodes to a source of electrical potential.

DETAILED DESCRIPTION

The present disclosure describes methods and apparatuses for removing conductive materials from a microelectronic substrate and/or substrate assembly used in the fabrication of microelectronic devices. Many specific details of certain embodiments of the invention are set forth in the following description and in FIGS. 3–11 to provide a thorough understanding of these embodiments. One skilled in the art, however, will understand that the present invention may have additional embodiments, or that the invention may be practiced without several of the details described below.

FIGS. 3–9B and the associated discussion refer generally to devices for removing conductive material from microelectronic substrates in accordance with embodiments of the invention. FIGS. 10A–11 and the associated discussion refer generally to techniques for rounding or blunting corners of conductive materials using, for example, apparatuses of the type described with reference to FIGS. 3–9B. As used herein, the term conductive materials includes, but is not limited to, metals, such as copper, platinum and aluminum, and semiconductor materials, such as doped silicon and/or polysilicon. The term microelectronic substrate refers generally to substrates and substrate assemblies configured to support microelectronic features, such as semiconductor devices.

Figure 3:
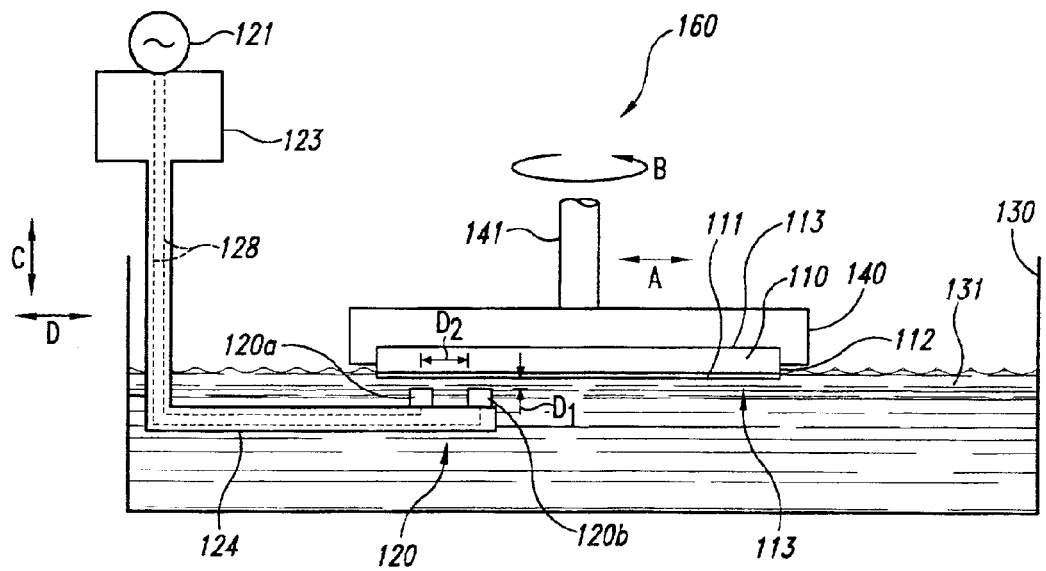
FIG. 3 is a partially schematic, side elevational view of an apparatus having a support member and a pair of electrodes for removing conductive material from a microelectronic substrate in accordance with an embodiment of the invention.

FIG. 3 is a partially schematic, side elevational view of an apparatus 160 for removing conductive material from a microelectronic substrate or substrate assembly 110 in accordance with an embodiment of the invention. In one aspect of this embodiment, the apparatus 160 includes a vessel 130 containing an electrolyte 131, which can be in a liquid or a gel state. As used herein, the terms electrolyte and electrolytic fluid refer generally to electrolytic liquids and gels. Structures in fluid communication with electrolytic fluids are accordingly in fluid communication with electrolytic liquids or gels.

The microelectronic substrate 110 has an edge surface 112 and two face surfaces 113. A support member 140 supports the microelectronic substrate 110 relative to the vessel 130 so that a conductive layer 111 on at least one of the face surfaces 113 of the substrate 110 contacts the electrolyte 131. The conductive layer 111 can include metals such as platinum, tungsten, tantalum, gold, copper, or other conductive materials. In another aspect of this embodiment, the support member 140 is coupled to a substrate drive unit 141 that moves the support member 140 and the substrate 110 relative to the vessel 130. For example, the substrate drive unit 141 can translate the support member 140 (as indicated by arrow "A") and/or rotate the support member 140 (as indicated by arrow "B").

The apparatus 160 can further include a first electrode 120a and a second electrode 120b (referred to collectively as electrodes 120) supported relative to the microelectronic substrate 110 by a support member 124. In one aspect of this embodiment, the support arm 124 is coupled to an electrode drive unit 123 for moving the electrodes 120 relative to the microelectronic substrate 110. For example, the electrode drive unit 123 can move the electrodes toward and away from the conductive layer 111 of the microelectronic substrate 110, (as indicated by arrow "C"), and/or transversely (as indicated by arrow "D") in a plane generally parallel to the conductive layer 111. Alternatively, the electrode drive unit 123 can move the electrodes in other fashions, or the electrode drive unit 123 can be eliminated when the substrate drive unit 141 provides sufficient relative motion between the substrate 110 and the electrodes 120.

In either embodiment described above with reference to FIG. 3, the electrodes 120 are coupled to a current source 121 with leads 128 for supplying electrical current to the electrolyte 131 and the conductive layer 111. In operation, the current source 121 supplies an alternating current (single phase or multiphase) to the electrodes 120. The current passes through the electrolyte 131 and reacts electrochemically with the conductive layer 111 to remove material (for example, atoms or groups of atoms) from the conductive layer 111. The electrodes 120 and/or the substrate 110 can be moved relative to each other to remove material from selected portions of the conductive layer 111, or from the entire conductive layer 111.

In one aspect of an embodiment of the apparatus 160 shown in FIG. 3, a distance $D_1$ between the electrodes 120 and the conductive layer 111 is set to be smaller than a distance $D_2$ between the first electrode 120a and the second electrode 120b. Furthermore, the electrolyte 131 generally has a higher resistance than the conductive layer 111. Accordingly, the alternating current follows the path of least resistance from the first electrode 120a, through the electrolyte 131 to the conductive layer 111 and back through the electrolyte 131 to the second electrode 120b, rather than from the first electrode 120a directly through the electrolyte 131 to the second electrode 120b. Alternatively, a low dielectric material (not shown) can be positioned between the first electrode 120a and the second electrode 120b to decouple direct electrical communication between the electrodes 120 that does not first pass through the conductive layer 111.

Figure 1A:
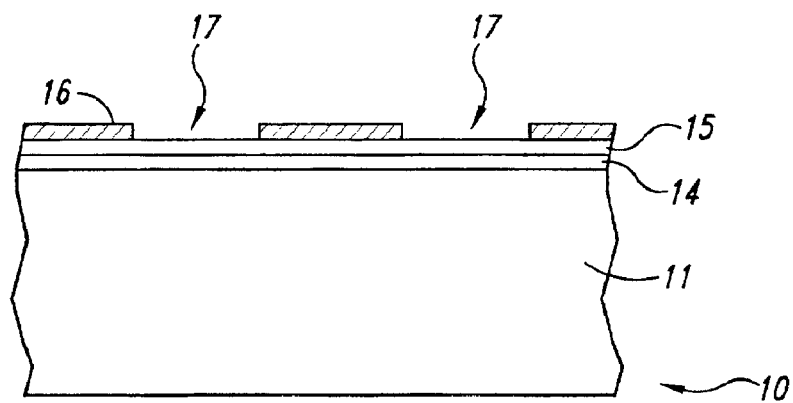
FIGS. 1A–C are schematic illustrations of a shallow trench isolation process for forming semiconductor features in a semiconductor substrate in accordance with the prior art.
Figure 1B:
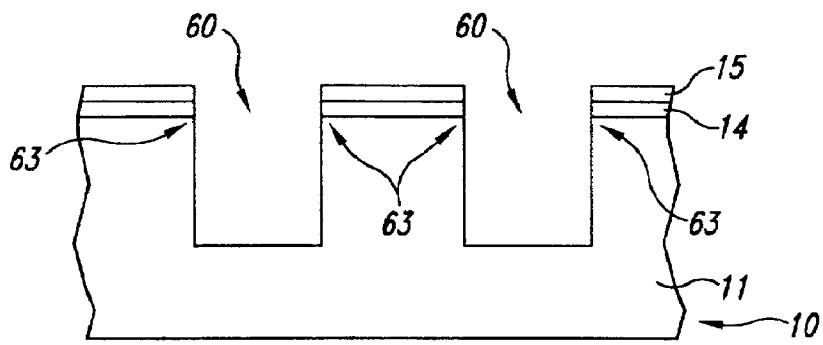
Figure 1C:
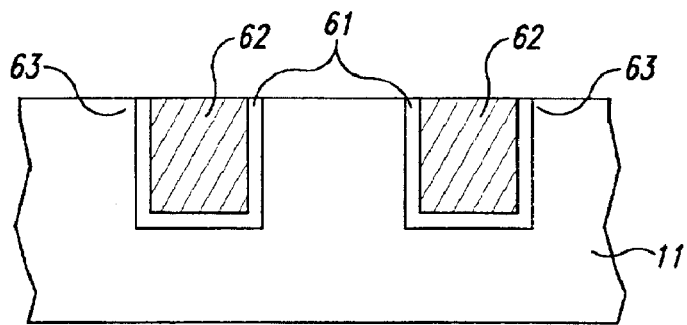
Figure 2A:
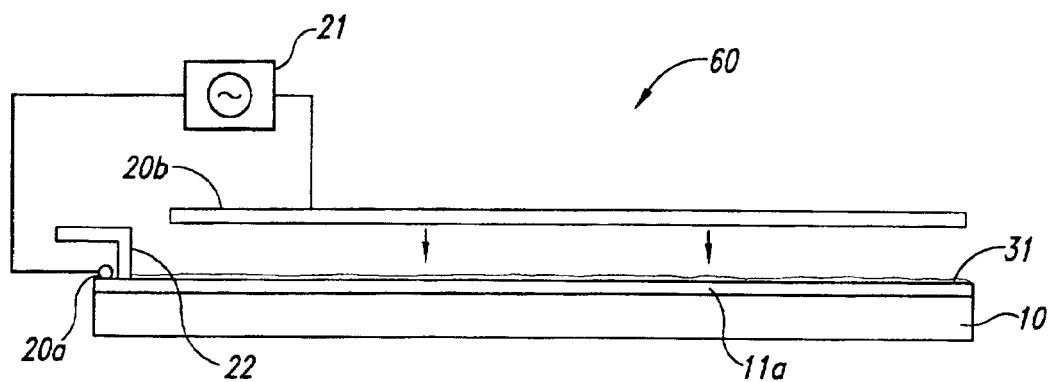
FIGS. 2A–B are partially schematic, side elevational views of apparatuses for removing conductive material from a semiconductor substrate in accordance with the prior art.
Figure 2B:
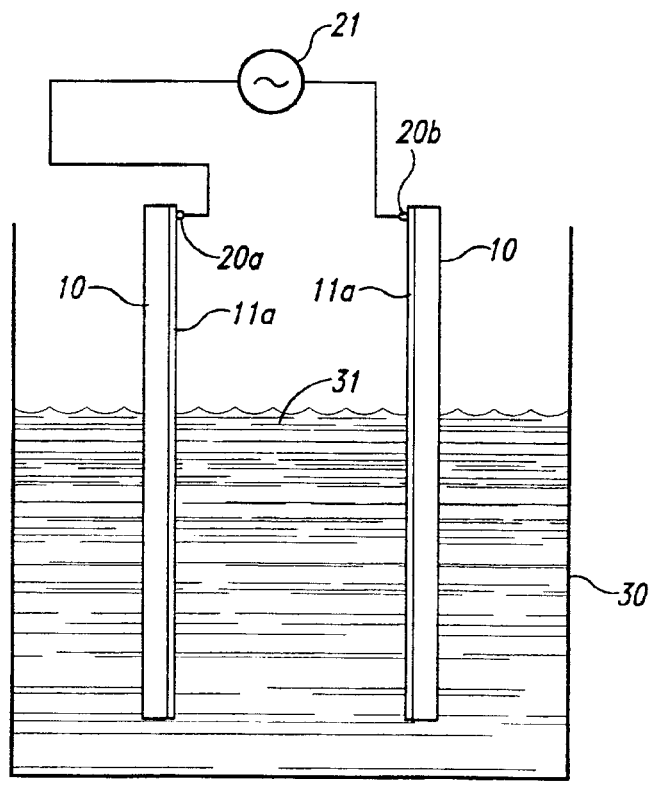

One feature of an embodiment of the apparatus 160 shown in FIG. 3 is that the electrodes 120 do not contact the conductive layer 111 of the substrate 110. An advantage of this arrangement is that it can eliminate the residual conductive material resulting from a direct electrical connection between the electrodes 120 and the conductive layer 111, described above with reference to FIGS. 1 and 2. For example, the apparatus 160 can eliminate residual conductive material adjacent to the contact region between the electrodes and the conductive layer because the electrodes 120 do not contact the conductive layer 111.

Another feature of an embodiment of the apparatus 160 described above with reference to FIG. 3 is that the substrate 110 and/or the electrodes 120 can move relative to the other to position the electrodes 120 at any point adjacent to the conductive layer 111. An advantage of this arrangement is that the electrodes 120 can be sequentially positioned adjacent to every portion of the conductive layer to remove material from the entire conductive layer 111. Alternatively, when it is desired to remove only selected portions of the conductive layer 111, the electrodes 120 can be moved to those selected portions, leaving the remaining portions of the conductive layer 111 intact.

Figure 4:
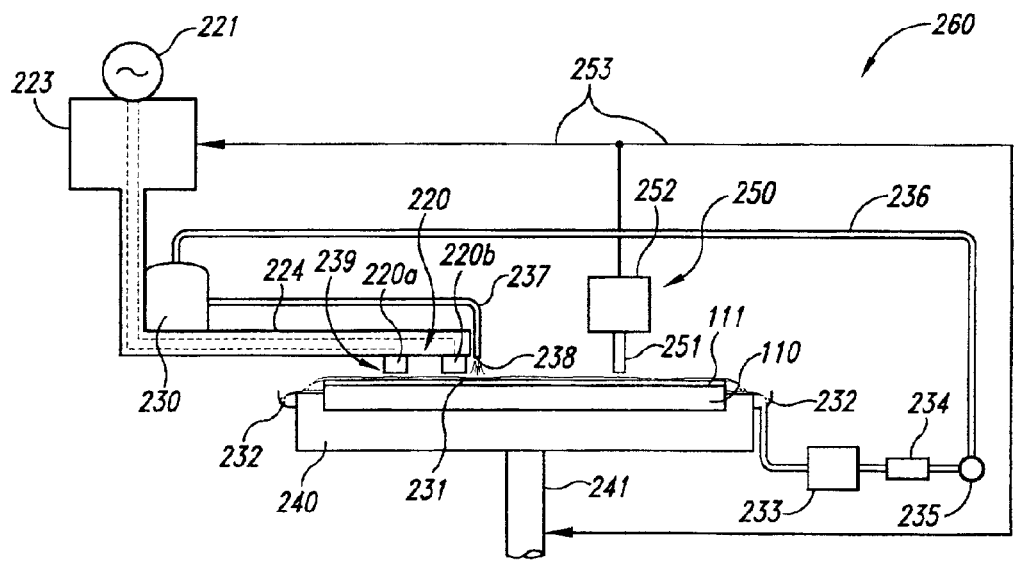
FIG. 4 is a partially schematic, side elevational view of an apparatus for removing conductive material and sensing characteristics of the microelectronic substrate from which the material is removed in accordance with another embodiment of the invention.

FIG. 4 is a partially schematic, side elevational view of an apparatus 260 that includes a support member 240 positioned to support the substrate 110 in accordance with another embodiment of the invention. In one aspect of this embodiment, the support member 240 supports the substrate 110 with the conductive layer 111 facing upwardly. A substrate drive unit 241 can move the support member 240 and the substrate 110, as described above with reference to FIG. 3. First and second electrodes 220a and 220b are positioned above the conductive layer 111 and are coupled to a current source 221. A support member 224 supports the electrodes 220 relative to the substrate 110 and is coupled to an electrode drive unit 223 to move the electrodes 220 over the surface of the support conductive layer 111 in a manner generally similar to that described above with reference to FIG. 3.

In one aspect of the embodiment shown in FIG. 4, the apparatus 260 further includes an electrolyte vessel 230 having a supply conduit 237 with an aperture 238 positioned proximate to the electrodes 220. Accordingly, an electrolyte 231 can be disposed locally in an interface region 239 between the electrodes 220 and the conductive layer 111, without necessarily covering the entire conductive layer 111. The electrolyte 231 and the conductive material removed from the conductive layer 111 flow over the substrate 110 and collect in an electrolyte receptacle 232. The mixture of electrolyte 231 and conductive material can flow to a reclaimer 233 that removes most of the conductive material from the electrolyte 231. A filter 234 positioned downstream of the reclaimer 233 provides additional filtration of the electrolyte 231 and a pump 235 returns the reconditioned electrolyte 231 to the electrolyte vessel 230 via a return line 236.

In another aspect of the embodiment shown in FIG. 4, the apparatus 260 can include a sensor assembly 250 having a sensor 251 positioned proximate to the conductive layer 111, and a sensor control unit 252 coupled to the sensor 251 for processing signals generated by the sensor 251. The control unit 252 can also move the sensor 251 relative to the substrate 110. In a further aspect of this embodiment, the sensor assembly 250 can be coupled via a feedback path 253 to the electrode drive unit 223 and/or the substrate drive unit 241. Accordingly, the sensor 251 can determine which areas of the conductive layer 111 require additional material removal and can move the electrodes 220 and/or the substrate 110 relative to each other to position the electrodes 220 over those areas. Alternatively, (for example, when the removal process is highly repeatable), the electrodes 220 and/or the substrate 110 can move relative to each other according to a pre-determined motion schedule.

The sensor 251 and the sensor control unit 252 can have any of a number of suitable configurations. For example, in one embodiment, the sensor 251 can be an optical sensor that detects removal of the conductive layer 111 by detecting a change in the intensity, wavelength or phase shift of the light reflected from the substrate 110 when the conductive material is removed. Alternatively, the sensor 251 can emit and detect reflections of radiation having other wavelengths, for example, x-ray radiation. In still another embodiment, the sensor 251 can measure a change in resistance or capacitance of the conductive layer 111 between two selected points. In a further aspect of this embodiment, one or both of the electrodes 220 can perform the function of the sensor 251 (as well as the material removal function described above), eliminating the need for a separate sensor 251. In still further embodiments, the sensor 251 can detect a change in the voltage and/or current drawn from the current supply 221 as the conductive layer 111 is removed.

In any of the embodiments described above with reference to FIG. 4, the sensor 251 can be positioned apart from the electrolyte 231 because the electrolyte 231 is concentrated in the interface region 239 between the electrodes 220 and the conductive layer 111. Accordingly, the accuracy with which the sensor 251 determines the progress of the electrolytic process can be improved because the electrolyte 231 will be less likely to interfere with the operation of the sensor 251. For example, when the sensor 251 is an optical sensor, the electrolyte 231 will be less likely to distort the radiation reflected from the surface of the substrate 110 because the sensor 251 is positioned away from the interface region 239.

Another feature of an embodiment of the apparatus 260 described above with reference to FIG. 4 is that the electrolyte 231 supplied to the interface region 239 is continually replenished, either with a reconditioned electrolyte or a fresh electrolyte. An advantage of this feature is that the electrochemical reaction between the electrodes 220 and the conductive layer 111 can be maintained at a high and consistent level.

Figure 5:
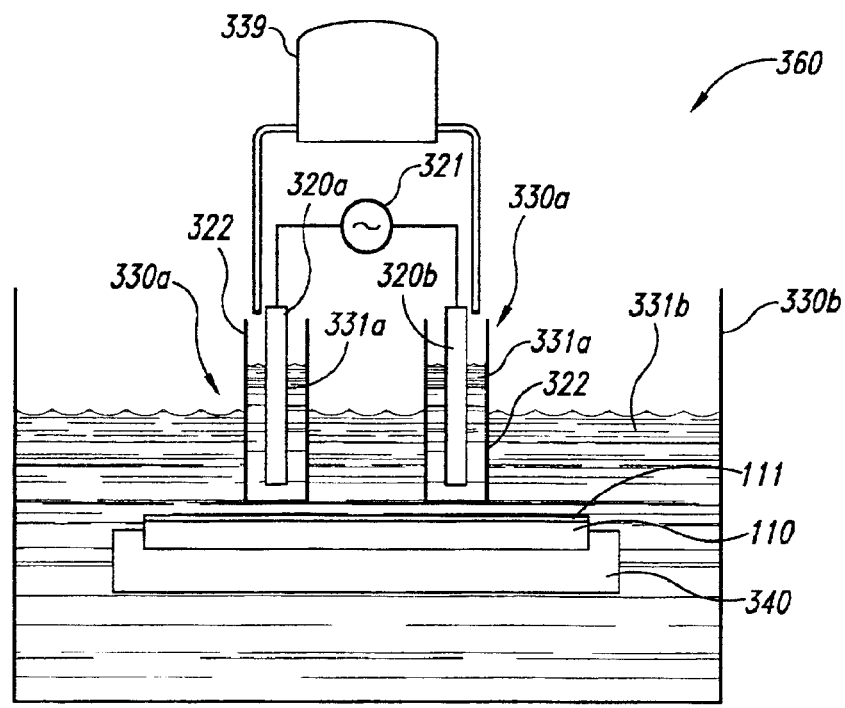
FIG. 5 is a partially schematic, side elevational view of an apparatus that includes two electrolytes in accordance with still another embodiment of the invention.

FIG. 5 is a partially schematic, side elevational view of an apparatus 360 that directs alternating current to the substrate 110 through a first electrolyte 331a and a second electrolyte 331b. In one aspect of this embodiment, the first electrolyte 331a is disposed in two first electrolyte vessels 330a, and the second electrolyte 331b is disposed in a second electrolyte vessel 330b. The first electrolyte vessels 330a are partially submerged in the second electrolyte 331b. The apparatus 360 can further include electrodes 320, shown as a first electrode 320a and a second electrode 320b, each coupled to a current supply 321 and each housed in one of the first electrolyte vessels 330a. Alternatively, one of the electrodes 320 can be coupled to ground. The electrodes 320 can include materials such as silver, platinum, copper and/or other materials, and the first electrolyte 331a can include sodium chloride, potassium chloride, copper sulfate and/or other electrolytes that are compatible with the material forming the electrodes 320.

In one aspect of this embodiment, the first electrolyte vessels 330a include a flow restrictor 322, such as a permeable isolation membrane formed from Teflon™, sintered materials such as sintered glass, quartz or sapphire, or other suitable porous materials that allow ions to pass back and forth between the first electrolyte vessels 330a and the second electrolyte vessel 330b, but do not allow the second electrolyte 330b to pass inwardly toward the electrodes 320 (for example, in a manner generally similar to a salt bridge). Alternatively, the first electrolyte 331a can be supplied to the electrode vessels 330a from a first electrolyte source 339 at a pressure and rate sufficient to direct the first electrolyte 331a outwardly through the flow restrictor 322 without allowing the first electrolyte 331a or the second electrolyte 330b to return through the flow restrictor 322. In either embodiment, the second electrolyte 331b remains electrically coupled to the electrodes 320 by the flow of the first electrolyte 331a through the restrictor 322.

In one aspect of this embodiment, the apparatus 360 can also include a support member 340 that supports the substrate 110 with the conductive layer 111 facing toward the electrodes 320. For example, the support member 340 can be positioned in the second electrolyte vessel 330b. In a further aspect of this embodiment, the support member 340 and/or the electrodes 320 can be movable relative to each other by one or more drive units (not shown).

One feature of an embodiment of the apparatus 360 described above with reference to FIG. 5 is that the first electrolyte 331a can be selected to be compatible with the electrodes 320. An advantage of this feature is that the first electrolyte 331a can be less likely than conventional electrolytes to degrade the electrodes 320. Conversely, the second electrolyte 331b can be selected without regard to the effect it has on the electrodes 320 because it is chemically isolated from the electrodes 320 by the flow restrictor 322. Accordingly, the second electrolyte 331b can include hydrochloric acid or another agent that reacts aggressively with the conductive layer 111 of the substrate 110.

Figure 6:
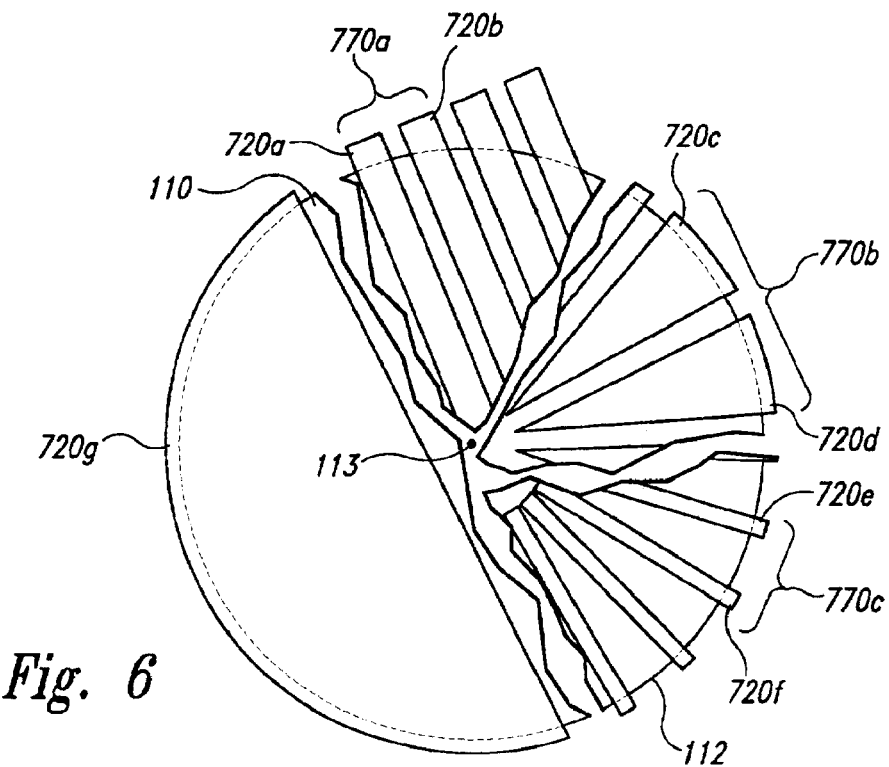
FIG. 6 is a partially schematic, plan view of a substrate adjacent to a plurality of electrodes in accordance with still further embodiments of the invention.

FIG. 6 is a top plan view of the microelectronic substrate 110 positioned beneath a plurality of electrodes having shapes and configurations in accordance with several embodiments of the invention. For purposes of illustration, several different types of electrodes are shown positioned proximate to the same microelectronic substrate 110; however, in practice, electrodes of the same type can be positioned relative to a single microelectronic substrate 110.

In one embodiment, electrodes 720a and 720b can be grouped to form an electrode pair 770a, with each electrode 720a and 720b coupled to an opposite terminal of a current supply 121 (FIG. 3). The electrodes 770a and 770b can have an elongated or strip-type shape and can be arranged to extend parallel to each other over the diameter of the substrate 110. The spacing between adjacent electrodes of an electrode pair 370a can be selected to direct the electrical current into the substrate 110, as described above with reference to FIG. 3.

In an alternate embodiment, electrodes 720c and 720d can be grouped to form an electrode pair 770b, and each electrode 720c and 720d can have a wedge or "pie" shape that tapers inwardly toward the center of the microelectronic substrate 110. In still another embodiment, narrow, strip-type electrodes 720e and 720f can be grouped to form electrode pairs 770c, with each electrode 720e and 720f extending radially outwardly from the center 113 of the microelectronic substrate 110 toward the periphery 112 of the microelectronic substrate 110.

In still another embodiment, a single electrode 720g can extend over approximately half the area of the microelectronic substrate 110 and can have a semicircular planform shape. The electrode 720g can be grouped with another electrode (not shown) having a shape corresponding to a mirror image of the electrode 720g, and both electrodes can be coupled to the current source 121 to provide alternating current to the microelectronic substrate in any of the manners described above with reference to FIGS. 3–5.

Figure 7:
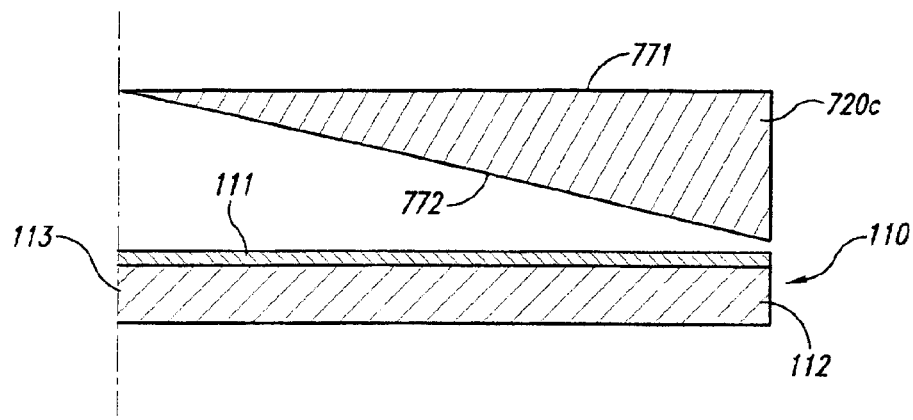
FIG. 7 is a cross-sectional side elevational view of an electrode and a substrate in accordance with yet another embodiment of the invention.

FIG. 7 is a partially schematic, cross-sectional side elevational view of a portion of the substrate 110 positioned beneath the electrode 720c described above with reference to FIG. 6. In one aspect of this embodiment, the electrode 720c has an upper surface 771 and a lower surface 772 opposite the upper surface 771 and facing the conductive layer 111 of the substrate 110. The lower surface 772 can taper downwardly from the center 113 of the substrate 110 toward the perimeter 112 of the substrate 110 in one aspect of this embodiment to give the electrode 720c a wedge-shaped profile. Alternatively, the electrode 720c can have a plate-type configuration with the lower surface 772 positioned as shown in FIG. 7 and the upper surface 771 parallel to the lower surface 772. One feature of either embodiment is that the electrical coupling between the electrode 720c and the substrate 110 can be stronger toward the periphery 112 of the substrate 110 than toward the center 113 of the substrate 110. This feature can be advantageous when the periphery 112 of the substrate 110 moves relative to the electrode 720c at a faster rate than does the center 113 of the substrate 110, for example, when the substrate 110 rotates about its center 113. Accordingly, the electrode 720c can be shaped to account for relative motion between the electrode and the substrate 110.

In other embodiments, the electrode 720c can have other shapes. For example, the lower surface 772 can have a curved rather than a flat profile. Alternatively, any of the electrodes described above with reference to FIG. 6 (or other electrodes having shapes other than those shown in FIG. 6) can have a sloped or curved lower surface. In still further embodiments, the electrodes can have other shapes that account for relative motion between the electrodes and the substrate 110.

Figure 8A:
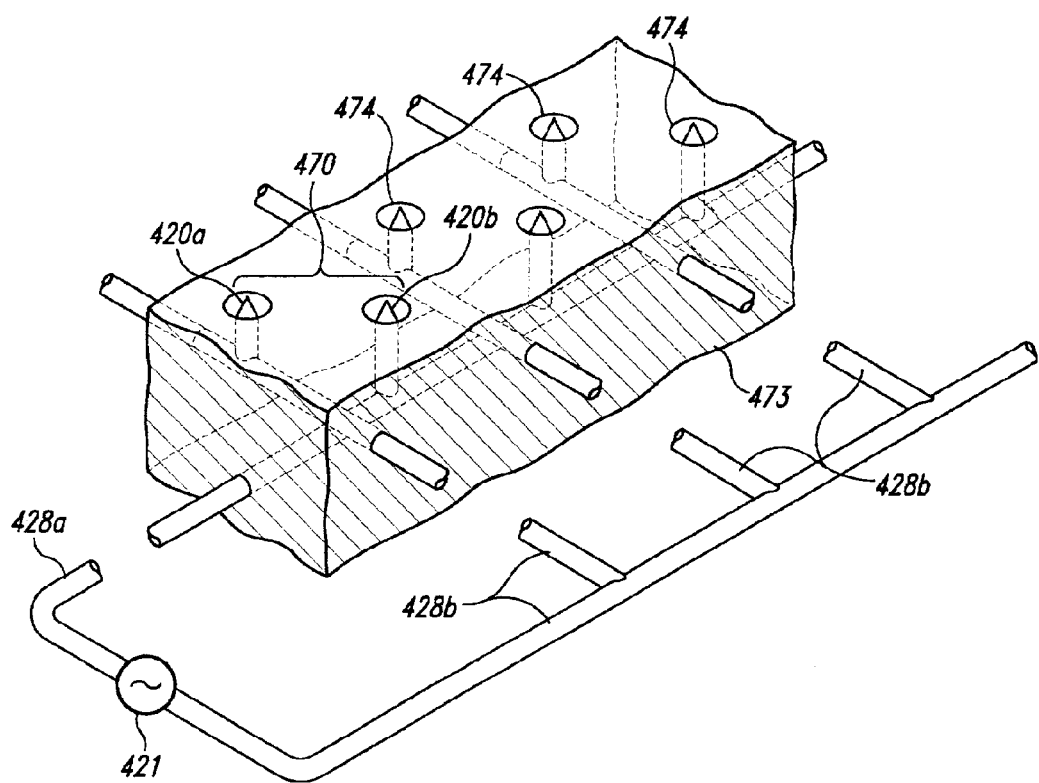
FIG. 8A is a partially schematic, isometric view of a portion of a support for housing electrode pairs in accordance with still another embodiment of the invention.

FIG. 8A is a partially schematic view of an electrode support 473 for supporting a plurality of electrodes in accordance with another embodiment of the invention. In one aspect of this embodiment, the electrode support 473 can include a plurality of electrode apertures 474, each of which houses either a first electrode 420a or a second electrode 420b. The first electrodes 420a are coupled through the apertures 474 to a first lead 428a and the second electrodes 420b are coupled to a second lead 428b. Both of the leads 428a and 428b are coupled to a current supply 421. Accordingly, each pair 470 of first and second electrodes 420a and 420b defines part of a circuit that is completed by the substrate 110 and the electrolyte(s) described above with reference to FIGS. 3–5.

In one aspect of this embodiment, the first lead 428a can be offset from the second lead 428b to reduce the likelihood for short circuits and/or capacitive coupling between the leads. In a further aspect of this embodiment, the electrode support 473 can have a configuration generally similar to any of those described above with reference to FIGS. 1–7. For example, any of the individual electrodes (e.g., 320a, 320c, 320e, or 320g) described above with reference to FIG. 6 can be replaced with an electrode support 473 having the same overall shape and including a plurality of apertures 474, each of which houses one of the first electrodes 420a or the second electrodes 420b.

In still a further aspect of this embodiment, the electrode pairs 470 shown in FIG. 8A can be arranged in a manner that corresponds to the proximity between the electrodes 420a, 420b and the microelectronic substrate 110 (FIG. 7), and/or the electrode pairs 470 can be arranged to correspond to the rate of relative motion between the electrodes 420a, 420b and the microelectronic substrate 110. For example, the electrode pairs 470 can be more heavily concentrated in the periphery 112 of the substrate 110 or other regions where the relative velocity between the electrode pairs 470 and the substrate 110 is relatively high (see FIG. 7). Accordingly, the increased concentration of electrode pairs 470 can provide an increased electrolytic current to compensate for the high relative velocity. Furthermore, the first electrode 420a and the second electrode 420b of each electrode pair 470 can be relatively close together in regions (such as the periphery 112 of the substrate 110) where the electrodes are close to the conductive layer 111 (see FIG. 7) because the close proximity to the conductive layer 111 reduces the likelihood for direct electrical coupling between the first electrode 420a and the second electrode 420b. In still a further aspect of this embodiment, the amplitude, frequency and/or waveform shape supplied to different electrode pairs 470 can vary depending on factors such as the spacing between the electrode pair 470 and the microelectronic substrate 110, and the relative velocity between the electrode pair 470 and the microelectronic substrate 110.

Figure 8B:
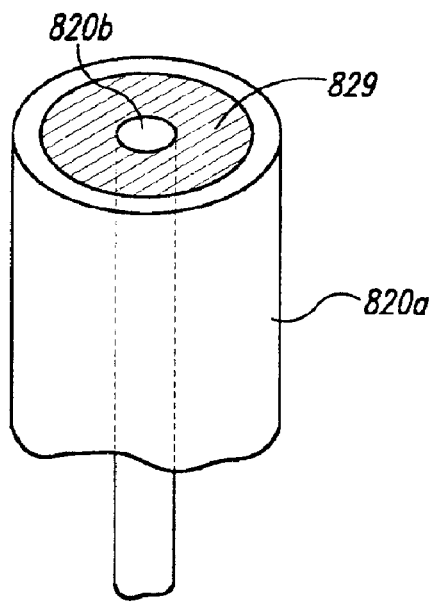
FIGS. 8B–8C are isometric views of electrodes in accordance with still further embodiments of the invention.
Figure 8C:
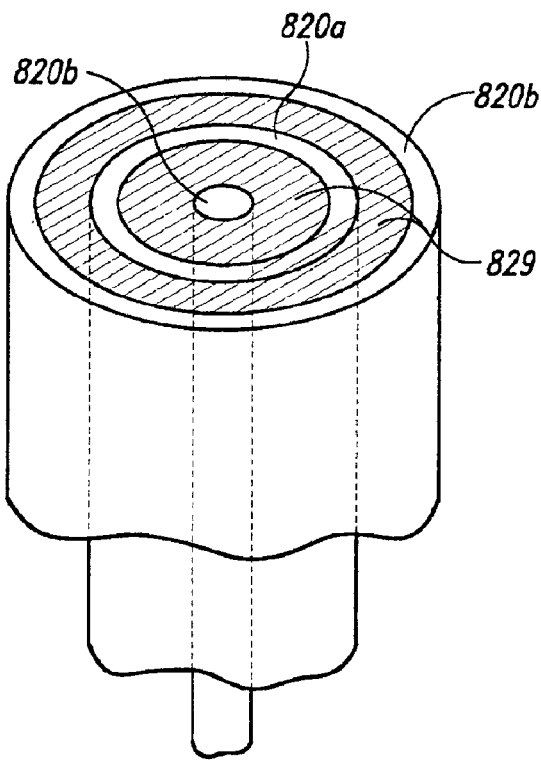

FIGS. 8B and 8C illustrate electrodes 820 (shown as first electrodes 820a and second electrodes 820b) arranged concentrically in accordance with still further embodiments of the invention. In one embodiment shown in FIG. 8B, the first electrode 820a can be positioned concentrically around the second electrode 820b, and a dielectric material 829 can be disposed between the first electrode 820a and the second electrode 820b. The first electrode 820a can define a complete 360° arc around the second electrode 820b, as shown in FIG. 8B, or alternatively, the first electrode 820a can define an arc of less than 360°.

In another embodiment, shown in FIG. 8C, the first electrode 820A can be concentrically disposed between two second electrodes 820b, with the dielectric material 829 disposed between neighboring electrodes 820. In one aspect of this embodiment, current can be supplied to each of the second electrodes 820b with no phase shifting. Alternatively, the current supplied to one second electrode 820b can be phase-shifted relative to the current supplied to the other second electrode 820b. In a further aspect of the embodiment, the current supplied to each second electrode 820b can differ in characteristics other than phase, for example, amplitude.

One feature of the electrodes 820 described above with respect to FIGS. 8B and 8C is that the first electrode 820a can shield the second electrode(s) 820b from interference from other current sources. For example, the first electrode 820a can be coupled to ground to shield the second electrodes 820b. An advantage of this arrangement is that the current applied to the substrate 110 (FIG. 7) via the electrodes 820 can be more accurately controlled.

Figure 9A:
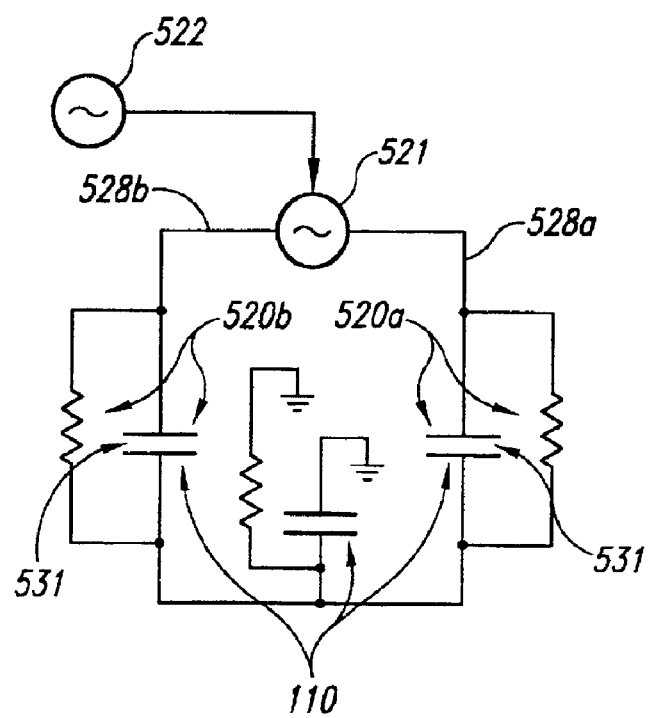
FIGS. 9A and 9B schematically illustrate a circuit and waveform for electrolytically processing a microelectronic substrate in accordance with yet another embodiment of the invention.
Figure 10A:
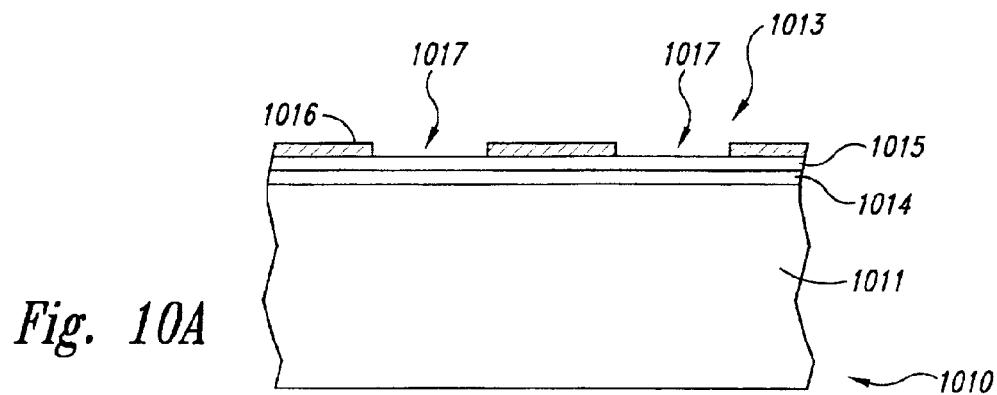
FIG. 10A–F schematically illustrate a process for rounding or blunting the corners of apertures in a conductive material of a microelectronic substrate in accordance with an embodiment of the invention.

FIG. 9A is a schematic circuit representation of some of the components described above with reference to FIGS. 3–8C. As shown schematically in FIG. 9A, the current source 521 is coupled to the first electrode 520a and the second electrode 520b with leads 528a and 528b respectively. The electrodes 520a and 520b are coupled to the microelectronic substrate 110 with the electrolyte 531 in an arrangement that can be represented schematically by two sets of parallel capacitors and resistors. A third capacitor and resistor schematically indicate that the microelectronic substrate 110 "floats" relative to ground or another potential.

Figure 9B:
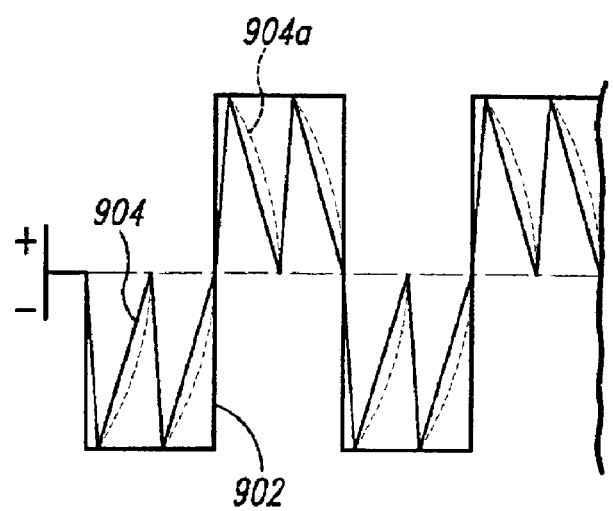

In one aspect of an embodiment shown in FIG. 9A, the current source 521 can be coupled to an amplitude modulator 522 that modulates the signal produced by the current source 521, as is shown in FIG. 9B. Accordingly, the current source 521 can generate a high-frequency wave 904, and the amplitude modulator 522 can superimpose a low-frequency wave 902 on the high-frequency wave 904. For example, the high-frequency wave 904 can include a series of positive or negative voltage spikes contained within a square wave envelope defined by the low-frequency wave 902. Each spike of the high-frequency wave 904 can have a relatively steep rise time slope to transfer charge through the dielectric to the electrolyte, and a more gradual fall time slope. The fall time slope can define a straight line, as indicated by high-frequency wave 904, or a curved line, as indicated by high-frequency wave 904a. In other embodiments, the high-frequency wave 904 and the low-frequency wave 902 can have other shapes depending, for example, on the particular characteristics of the dielectric material and electrolyte adjacent to the electrodes 420, the characteristics of the substrate 110, and/or the target rate at which material is to be removed from the substrate 110.

An advantage of this arrangement is that the high frequency signal can transmit the required electrical energy from the electrodes 520a and 520b to the microelectronic substrate 110, while the low frequency superimposed signal can more effectively promote the electrochemical reaction between the electrolyte 531 and the conductive layer 111 of the microelectronic substrate 110. Accordingly, any of the embodiments described above with reference to FIGS. 3–8C can include an amplitude modulator in addition to a current source.

FIGS. 10A–F schematically illustrate a process for forming features in a microelectronic substrate in accordance with another embodiment of the invention, using any of the devices described above with reference to FIGS. 3–8C. In one aspect of this embodiment, the process can include forming shallow trench isolation (STI) features, and in other embodiments, the process can include forming other types of features. In any of these embodiments, the process can include rounding or blunting corners of a conductive material, as described in greater detail below.

FIG. 10A illustrates a portion of a microelectronic substrate 1010 having a face surface 1013 with a conductive, partially conductive, and/or semiconductive material 1011 (referred to collectively as a conductive material 1011). For example, in one embodiment, the conductive material 1011 can include silicon doped with boron or phosphorous. In other embodiments, the conductive material 1011 can include other conductive or semiconductive materials. In any of these embodiments, the process can further include forming apertures in the conductive material 1011, for example, to support a dielectric material or other microelectronic feature. In one aspect of this embodiment, the process can include disposing an oxide layer 1014 on the conductive material 101, and then disposing a nitride layer 1015 on the oxide layer 1014. A mask 1016 having openings 1017 corresponding to the desired location of the microelectronic features is positioned adjacent to the nitride layer 1015, and the microelectronic substrate 1010 is exposed to an etchant.

Figure 10B:
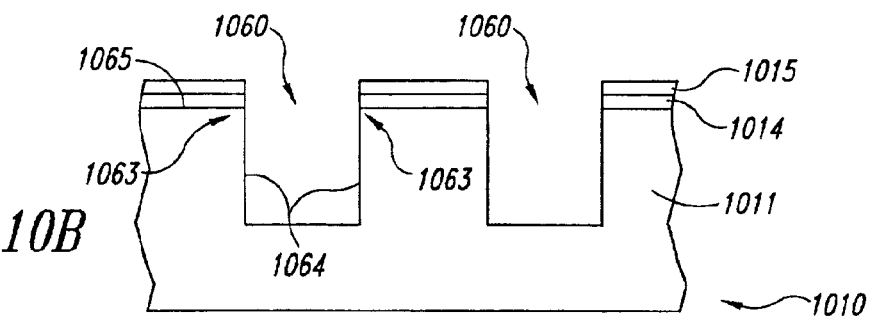
Figure 11:
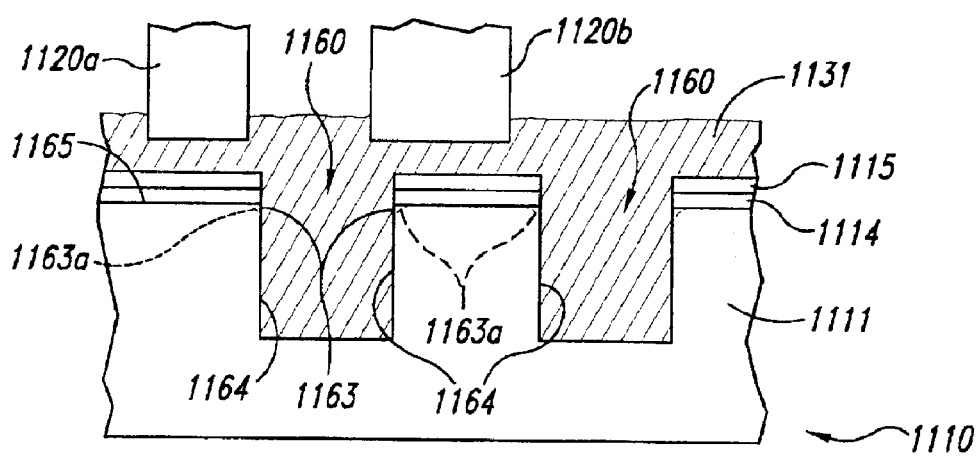
FIG. 11 is a partially schematic illustration of a process for rounding or blunting the corners of apertures in a conductive material of a microelectronic substrate in accordance with another embodiment of the invention.

As shown in FIG. 10B, the etchant can remove material positioned beneath the openings 1017 to form apertures 1060 or other recesses that extend through the nitride layer 1015, through the oxide layer 1014, and through an upper surface 1065 of the conductive material 1011. Accordingly, the apertures 1060 can include sidewalls 1064 generally transverse to the upper surface 1065, and corners 1063 at the junction between the sidewalls 1064 and the upper surface 1065.

Figure 10C:
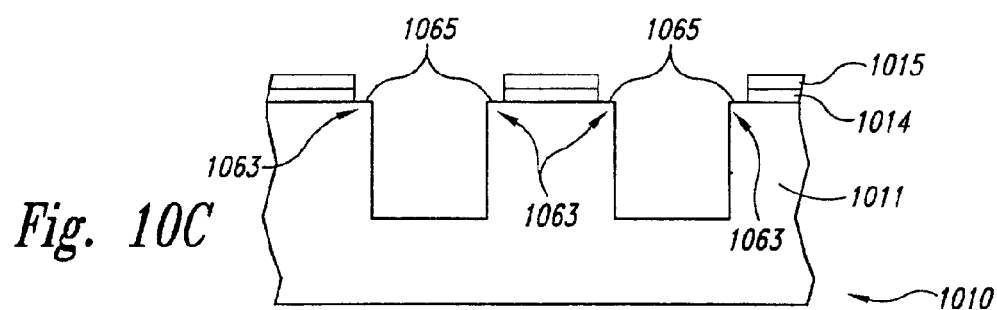

Referring now to FIG. 10C, the nitride layer 1015 and the oxide layer 1014 can be etched away from the corners 1063 before the corners 1063 are rounded or blunted. For example, in one aspect of this embodiment, a liquid etchant having about 500 parts water to about one part hydrofluoric acid and about one part hydrochloric acid can etch back the nitride layer 1015 and the oxide layer 1014 at approximately the same rate to expose the upper surface 1065 of the conductive material 1011 near the corners 1063. In a further aspect of this embodiment, the etching process can be completed at a temperature of about 60° C. In an alternate embodiment, the step of etching the nitride layer 1015 and the oxide layer 1014 back from the corners 1063 can be eliminated, as described in greater detail below with reference to FIG. 11.

Figure 10D:
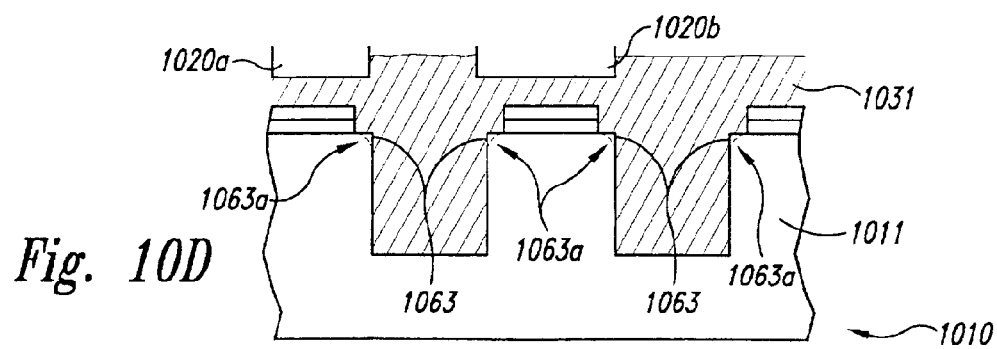

As shown in FIG. 10D, the exposed corners 1063 can be rounded or blunted to form rounded corners 1063a (shown in FIG. 10D in broken lines). For example, in one aspect of this embodiment, an electrolytic fluid 1031 can be disposed adjacent to the corners 1063 and placed in fluid communication with a first electrode 1020a and a second electrode 1020b (collectively referred to as electrodes 1020). In further aspect of this embodiment, the electrodes 1020 can be spaced apart from the microelectronic substrate 1010 by a distance of from about one millimeter to about two millimeters. In other embodiments, this spacing can have other values. At least one of the electrodes 1020 can be coupled to a source of electrical potential, such as an alternating current source, in a manner generally similar to that described above with reference to FIGS. 3–9B. Accordingly, electrical current will tend to flow from one of the electrodes 1020 through the electrolytic fluid 1031 to the corners 1063 to oxidize the conductive material at the corners 1063. The electrical current can travel through the conductive material 1011 and back through the electrolytic fluid 1031 to the other electrode 1020 to complete an electrical circuit. The oxidized material at the corner 1063 can be removed by chemical interaction with the electrolytic fluid to form the rounded corners 1063a.

In one aspect of this embodiment, electrical current can be introduced into the electrolytic fluid 1031 at a rate of from about one to about 500 mA/cm$^2$ (and in a particular embodiment, about 50 mA/cm$^2$), a frequency of about 60 Hz, and a voltage of about 15 V$_{rms}$. Alternatively, the electrical current can have other characteristics. In any of these embodiments, the composition of the electrolytic fluid 1031 can be the same as the composition of the etchant used to etch back the oxide layer 1014 and the nitride layer 1015. In a further aspect of this embodiment, the constituents of the electrolytic fluid 1031 can be selected to reduce or eliminate etching at the sidewalls 1064 of the apertures 1060. For example, when the conductive material 1011 includes silicon, hydrochloric acid in the electrolytic fluid 1031 can reduce the pH of the fluid to at least reduce etching at the sidewalls 1064. Accordingly, the electrolytic fluid 1031 can be (a) sufficiently conductive to conduct electrical current to the corners 1063 to oxidize conductive material at the corners 1063, (b) sufficiently reactive to remove oxidized material from the corners 1063, and (c) not so reactive as to remove un-oxidized material from the sidewalls 1064 of the aperture 1060. Alternatively, ethane glycol can be added to the electrolytic fluid 1031 to reduce the etching rate of the silicon sidewalls 1064. In other embodiments, other chemicals can be disposed in the electrolytic fluid 1031 to control the rate of material removal at the sidewalls 1064, while still allowing material from the corners 1063 to be removed, as discussed above.

Figure 10E:
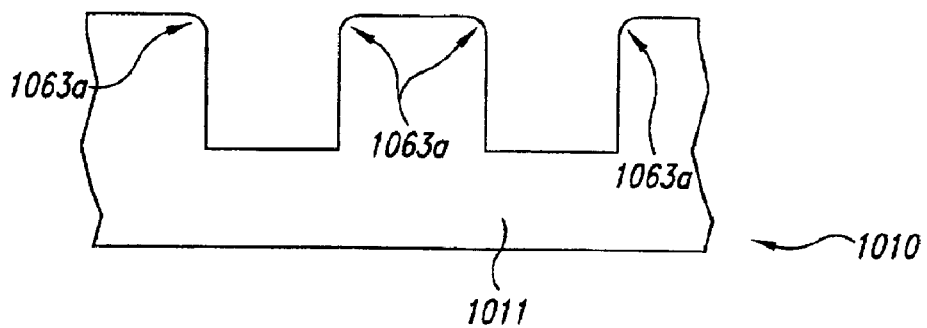

FIG. 10E illustrates a portion of the microelectronic substrate 1010 shown in FIG. 10D after the corners 1063 (FIG. 10D) have been rounded to form the blunted corners 1063a. In one aspect of this embodiment, the cross-sectional shape of the corners 1603a can define an approximately circular arc. In other embodiments, the blunted corners 1063a can have other shapes. In any of these embodiments, the blunted corners 1063a are rounder or less sharp than the sharp corners 1063 shown in FIG. 10D.

Figure 10F:
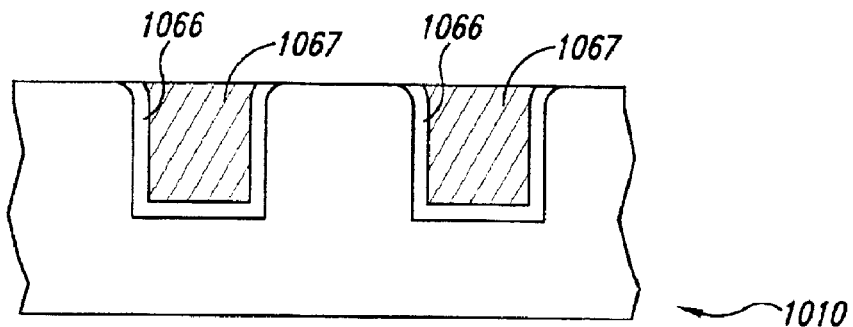

FIG. 10F shows a gate oxide material 1066 disposed in the apertures 1060 to coat the sidewalls 1064. The gates can then be formed by disposing a conventional gate material 1067 on the gate oxide 1066 within the apertures 1060.

One feature of an embodiment of the process described above with reference to FIGS. 10A–F is that the initially sharp corners 1063 formed at the junction between the sidewalls 1064 and the upper surface 1065 of the conductive material 1011 can be blunted or rounded without elevating the temperature of microelectronic substrate 1110 significantly above room temperature. Accordingly, the blunted corners 1063a can be less likely to emit electromagnetic signals during operation of the microelectronic substrate 1010, which can create interference with other features of the microelectronic substrate 1010. Additionally, the microelectronic substrate can be less expensive to manufacture and more reliable as a result of spending less time in a high temperature environment.

Another feature of an embodiment of the process described above with reference to FIGS. 10A–F is that the process can be self-limiting. For example, as conductive material 1011 at the corners 1063 oxidizes and etches away, the corners 1063 become blunter and less likely to attract electrical current any more rapidly than other conductive surfaces in fluid communication with the electrodes 1020. Accordingly, the process may not need to be monitored as closely as other material removal processes.

FIG. 11 is a partially schematic illustration of a process for rounding or blunting conductive corners of a microelectronic substrate 1110 in accordance with another embodiment of the invention. In one aspect of this embodiment, the microelectronic substrate 1110 can include conductive material 1111, an oxide layer 1114, and a nitride layer 1115 arranged generally in the same manner as that described above with reference to FIG. 10B. Apertures 1160 are etched through the nitride layer 1115 and the oxide layer 1114 and into the conductive material 1111, also in a manner generally similar to that described above with reference to FIG. 10B. The apertures 1160 can have sidewalls 1164 that form sharp corners 1163 where the apertures 1160 intersect an upper surface 1165 of the conductive material 1111.

In a further aspect of this embodiment, a first electrode 1120a and a second electrode 1120b can be positioned in fluid communication with an electrolyte 1131 disposed on the microelectronic substrate 1110 to round the initially sharp corners 1163 without first etching back the oxide layer 1114 and the nitride layer 1115 from the corners 1163. Accordingly, the oxide layer 1114 and the nitride layer 1115 can initially overhang the rounded corners 1163a, at least until the oxide layer 1114 and the nitride layer 1115 are removed from the microelectronic substrate 1110. An advantage of this process is that it can eliminate the step described above with reference to FIG. 10C.

From the foregoing, it will be appreciated that, although specific embodiments of the invention have been described herein for purposes of illustration, various modifications may be made without deviating from the spirit and scope of the invention. For example, the foregoing processes can be used to form features other than STI features. Accordingly, the invention is not limited except as by the appended claims.

What is claimed is:

1. A method for processing a microelectronic substrate, comprising:
   disposing an electrolytic fluid adjacent to a conductive material of the microelectronic substrate, the conductive material having a first surface in a first plane and a recess in the first surface, the recess being bounded by a second surface in a second plane, the conductive material further having a corner between the first and second surfaces;
   removing at least part of the conductive material from the corner by positioning first and second electrodes to be spaced apart from the microelectronic substrate and in fluid communication with the electrolytic fluid, coupling at least one of the electrodes to a source of electrical potential and passing electrical current from at least one electrode through the conductive material to the other electrode via the electrolytic fluid; and
   as the at least part of the conductive material is removed from the corner, attracting less electrical current to the corner to reduce a rate at which conductive material is removed from the corner.

2. The method of claim 1 wherein the microelectronic substrate has a face surface and the recess extends generally transverse to the face surface, further wherein removing at least part of the conductive material includes positioning two electrodes to face toward the face surface, coupling at least one of the electrodes to a source of electrical potential, and disposing an electrolytic fluid between the face surface and the electrodes.

3. The method of claim 1, further comprising:
   emitting electrical signals from an electrode spaced apart from the microelectronic substrate;
   receiving the electrical signals at the corner of the conductive material;
   oxidizing at least part of the conductive material at the corner by passing the electrical signals through the conductive material; and
   exposing an oxidized portion of the conductive material to a chemical etchant.

4. The method of claim 1 wherein the first surface of the conductive material is positioned proximate to a generally non-conductive material, with the generally non-conductive material positioned between the first surface and at least one of the electrodes, and wherein removing at least part of the conductive material from the corner includes removing conductive material engaged with the generally non-conductive material.

5. The method of claim 1, further comprising:
   disposing a generally non-conductive layer on the conductive material; and
   removing at least part of the non-conductive layer to expose the corner of the conductive material before removing at least part of the conductive material from the corner.

6. The method of claim 1, further comprising:
   disposing an oxide layer on the conductive material;
   disposing a nitride layer on the oxide layer; and
   removing at least part of the nitride layer and part of the oxide layer to expose the corner of the conductive material before removing conductive material from the corner.

7. The method of claim 1 wherein removing the conductive material includes oxidizing at least a potion of the conductive material by passing electrical current through the portion, and exposing the portion to an etchant.

8. The method of claim 1, further comprising selecting the electrolyte to include water and at least one of hydrochloric acid and hydrofluoric acid.

9. The method of claim 1 wherein removing at least part of the conductive material includes passing electrical current into the conductive material at a rate of from about one to about 500 milliamps per square centimeter.

10. The method of claim 1 wherein removing at least part of the conductive material includes selecting the source of electrical potential to provide about 15 $volts_{rms}$ to the conductive material.

11. The method of claim 1 wherein removing at least part of the conductive material includes selecting a current passing through the conductive material to vary at approximately 60 Hz.

12. The method of claim 1 wherein removing at least part of the conductive material includes selecting a current passing through the conductive material to be an alternating current.

13. The method of claim 1, further comprising selecting the electrolytic fluid to include water, hydrochloric acid, and hydrofluoric acid in a ratio of about 500:1:1.

14. The method of claim 1, further comprising selecting the conductive material to include doped silicon.

15. The method of claim 1, further comprising selecting at least one of the first and second electrodes to include at least one of platinum, tantalum and graphite.

16. The method of claim 1, further comprising positioning at least one of the first and second electrodes a distance of from about one millimeter to about two millimeters from the microelectronic substrate.

17. The method of claim 1, further comprising disposing an insulating layer on walls of the recess after removing material from the corner.

18. The method of claim 1, further comprising disposing a dielectric material in the recess.

19. A method for processing a microelectronic substrate, comprising:
   disposing a generally non-conductive material adjacent to a conductive material of the microelectronic substrate;
   forming a recess extending through the generally non-conductive material and into the conductive material, the recess defining a corner at least proximate to an interface between the conductive material and the generally non-conductive material;
   removing at least part of the conductive material from the corner to at least partially blunt the corner by exposing the corner to an electrical potential via an electrolytic fluid; and
   as the at least part of the conductive material is removed from the corner, attracting less electrical current to the corner to reduce a rate at which conductive material is removed from the corner.

20. The method of claim 19 wherein removing at least part of the conductive material includes positioning a first electrode and a second electrode proximate to and spaced apart from the microelectronic substrate, coupling at least one of the electrodes to a source of electrical potential, passing an electrical current from at least one of the electrodes to the corner to oxidize conductive material at the corner, and exposing oxidized conductive material at the corner to an etchant.

21. The method of claim 19, further comprising:
   emitting electrical signals from an electrode spaced apart from the microelectronic substrate;
   receiving the electrical signals at the corner of the conductive material;
   oxidizing at least part of the conductive material at the corner by passing the electrical signals through the conductive material; and
   exposing an oxidized portion of the conductive material to a chemical etchant.

22. The method of claim 19 wherein removing at least part of the conductive material from the corner includes removing conductive material engaged with the generally non-conductive material.

23. The method of claim 19, further comprising removing at least part of the non-conductive material to expose the corner of the conductive material before removing at least part of the conductive material from the corner.

24. The method of claim 19, further comprising:
   disposing an oxide layer on the conductive material;
   disposing a nitride layer on the oxide layer; and
   removing at least part of the nitride layer and part of the oxide layer to expose the corner of the conductive material before removing at least part of the conductive material from the corner.

25. The method of claim 19 wherein removing the conductive material includes oxidizing at least a portion of the conductive material by passing electrical current through the portion, and exposing the portion to an etchant.

26. The method of claim 19 wherein removing at least part of the conductive material includes passing electrical current into the conductive material at a rate of about 100 milliamps.

27. The method of claim 19, wherein removing at least part of the conductive material includes passing electrical current into the conductive material at a potential of about 15 volts rms.

28. The method of claim 19 wherein removing at least part of the conductive material includes passing a current through the conductive material at a frequency of approximately 60 Hz.

29. The method of claim 19 wherein removing at least part of the conductive material includes selecting a current passing through the conductive material to be an alternating current.

30. The method of claim 19, further comprising selecting the conductive material to include doped silicon.

31. The method of claim 19, wherein removing at least part of the conductive material includes positioning first and second electrodes in fluid communication with the corner, coupling at least one of the electrodes to a source of electrical potential, and selecting at least one of the first and second electrodes to include at least one of platinum, tantalum and graphite.

32. The method of claim 19, further comprising disposing an insulating layer on walls of the aperture after removing material from the corner.

33. The method of claim 19, further comprising forming a transistor gate in the recess.

34. The method of claim 19 wherein the microelectronic substrate has a face surface and the recess extends generally transverse to the face surface, further wherein removing at least part of the conductive material includes positioning two electrodes to face toward the face surface, coupling at least one of the electrodes to a source of electrical potential, and disposing an electrolytic fluid between the face surface and the electrodes.

35. A method for processing a microelectronic substrate, comprising:
   forming an oxide layer on a doped silicon material of the microelectronic substrate;
   disposing a nitride layer on the oxide layer;

etching a recess through the nitride layer and the oxide layer and into the conductive material;

removing a portion of the nitride layer and the oxide layer proximate to the recess to expose a corner of the conductive material;

disposing an electrolytic fluid adjacent to the corner of the conductive material;

oxidizing at least part of the conductive material at the corner by positioning first and second electrodes proximate to and spaced apart from the microelectronic substrate and in fluid communication with the electrolytic fluid, and coupling at least one of the electrodes to a source of electrical potential; and removing at least part of the oxidized material by exposing the oxidized material to an etchant; and reducing a rate at which material is removed from the corner by rounding the corner to reduce a flow of electrical current from the at least one electrode to the corner.

36. The method of claim 35, wherein removing a portion of the nitride layer and the oxide layer proximate to the recess includes removing material from the nitride layer at a first rate and removing material from the oxide layer at a second rate, with the first rate approximately equal to the second rate.

37. The method of claim 35, further comprising removing the oxide layer and the nitride layer with an etchant after removing at least part of the oxidized material.

38. The method of claim 35 wherein removing a portion of the nitride layer and the oxide layer proximate to the recess includes disposing an etchant adjacent to the nitride layer and the oxide layer, with the etchant having a chemical composition approximately the same as a chemical composition of the electrolytic fluid.

39. A method for processing a microelectronic substrate, comprising:

forming a recess in a conductive material of the microelectronic substrate, the recess defining a corner at an intersection of the aperture and a plane of the conductive material;

forming a conductive microelectronic feature in the recess; and controlling electromagnetic emanations from the conductive microelectronic feature by rounding the corner defined by the recess, wherein rounding the corner includes electrically coupling a source of electrical potential to the corner via an electrolytic fluid to oxidize the conductive material, removing oxidized material from the corner by exposing the oxidized material to an etchant, and as the oxidized material is removed from the corner, attracting less electrical current to the corner to slow a rate at which material is removed from the corner.

40. The method of claim 39 wherein forming a recess in a conductive material includes forming a recess in a semiconductor material.

41. The method of claim 39 wherein rounding the corner includes positioning a first electrode and a second electrode proximate to and spaced apart from the microelectronic substrate, coupling at least one of the first and second electrodes to a source of electrical potential, passing an electrical current from at least one of the first and second electrodes through an electrolytic fluid to the corner to oxidize conductive material at the corner, and exposing oxidized conductive material at the corner to an etchant.

42. The method of claim 39, further comprising:

emitting electrical signals from an electrode spaced apart from the microelectronic substrate;

receiving the electrical signals at the corner of the conductive material;

oxidizing at least part of the conductive material at the corner by passing the electrical signals through the conductive material; and exposing an oxidized portion of the conductive material to a chemical etchant.

43. The method of claim 39 wherein the conductive material is positioned proximate to a generally non-conductive material, with the generally non-conductive material positioned between the plane of the conductive material and at least one electrode, and wherein removing at least part of the conductive material from the corner includes removing conductive material engaged with the generally non-conductive material.

44. The method of claim 39, further comprising:

disposing a non-conductive layer on the conductive material; and removing at least part of the non-conductive layer to expose the corner of the conductive material before removing at least part of the conductive material from the corner.

45. The method of claim 39, further comprising:

disposing an oxide layer on the conductive material;

disposing a nitride layer on the oxide layer; and removing at least part of the nitride layer and part of the oxide layer to expose the corner of the conductive material before removing at least part of the conductive material from the corner.

46. The method of claim 39, further comprising selecting the conductive material to include doped silicon.

47. The method of claim 39, further comprising disposing an insulating layer on walls of the recess after rounding the corner.

48. The method of claim 39, further comprising forming a transistor gate in the recess.

49. The method of claim 39 wherein the microelectronic substrate has a face surface and the recess extends generally transverse to the face surface, further wherein rounding the corner includes positioning two electrodes to face toward the face surface, coupling at least one of the electrodes to a source of electrical potential, and disposing an electrolytic fluid between the face surface and the electrodes.

* * * * *

UNITED STATES PATENT AND TRADEMARK OFFICE
CERTIFICATE OF CORRECTION

| | | |
|---|---|---|
| PATENT NO. | : 7,094,131 B2 | |
| APPLICATION NO. | : 09/887767 | |
| DATED | : August 22, 2006 | |
| INVENTOR(S) | : Lee et al. | |

It is certified that error appears in the above-identified patent and that said Letters Patent is hereby corrected as shown below:

On Title Page item 56
<u>References Cited, Other Publications, Page 3:</u> please add --JUCHNIEWICZ, R. et al. "Influence of Pulsed Current on Platinised Titanium and Tantalum Anode Durability," International Congress on Metallic Corrosion, Proceedings - Volume 3, pp. 449-453, Toronto, June 3-7, 1984.--

Signed and Sealed this

Sixteenth Day of January, 2007

JON W. DUDAS
*Director of the United States Patent and Trademark Office*